Feb. 8, 1938. F. P. MILLER ET AL 2,108,007
METHOD AND APPARATUS FOR MAKING SLIDE FASTENERS
Filed June 22, 1934 5 Sheets-Sheet 1

INVENTORS
FRANK P. MILLER
LEWIS SKEEL
BY
Attorney

Feb. 8, 1938.  F. P. MILLER ET AL  2,108,007
METHOD AND APPARATUS FOR MAKING SLIDE FASTENERS
Filed June 22, 1934  5 Sheets-Sheet 2

INVENTORS
FRANK P. MILLER
LEWIS SKEEL
BY 
Attorney

Feb. 8, 1938.   F. P. MILLER ET AL   2,108,007
METHOD AND APPARATUS FOR MAKING SLIDE FASTENERS
Filed June 22, 1934   5 Sheets-Sheet 3

INVENTORS
FRANK P. MILLER
LEWIS SKEEL
BY
Attorney

Feb. 8, 1938. F. P. MILLER ET AL 2,108,007
METHOD AND APPARATUS FOR MAKING SLIDE FASTENERS
Filed June 22, 1934 5 Sheets-Sheet 5

INVENTORS
FRANK P. MILLER
LEWIS SKEEL

Attorney

Patented Feb. 8, 1938

2,108,007

UNITED STATES PATENT OFFICE 2,108,007

METHOD AND APPARATUS FOR MAKING SLIDE FASTENERS

Frank P. Miller and Lewis Skeel, Meadville, Pa., assignors, by mesne assignments, to Joy Fastener Company, Franklin, Pa., a corporation of Pennsylvania Application June 22, 1934, Serial No. 731,995

30 Claims. (Cl. 153—1)

This invention relates to slide fasteners and to the manufacture of the same.

Briefly, the invention looks to the production of slide fasteners in strip form and more particularly, in parallel rows at opposite edges of an intervening webbing or connecting band to achieve, among other things, a reduced cost of manufacture by forming two fastener elements with each stroke of the punch press, and thus doubling output without a corresponding augmentation of labor and equipment; to reduce material waste, and to provide for the easy handling of the fastener elements during the buffing, coloring, and such other intermediate processes as may be employed.

By way of preliminary reference to the coloring of the fastener elements in any selected manner and while still in strip form, it is pointed out that the connection of the fastener elements with the supporting webbing or band thereof is such that, although the fastener elements are severed from the supporting band after the coloring process, there will be left on the fastener elements no raw, uncolored metal edges or surfaces exposed to view, which edges or surfaces would mar the appearance of the finished product, especially when conspicuously in place on a garment, a handbag or one of the numerous other articles to which slide fasteners are applied.

Another advantage in the formation of the fastener elements in initially parallel connected rows will be found to reside in the ease and efficiency with which the fastener elements may be presented to the cutting-off or severing mechanism and then delivered separately to assembly units where the elements are spaced and arranged for connection with conventional or other mounting tapes.

The invention has as another feature a novel and improved form of assembly unit by which the fastener elements are attached to the mounting tapes.

In addition, the invention makes provision for the buffing of the fastener elements while still in strip form and immediately after the forming or punching operation to avoid special handling of the fastener elements for this purpose and, at the same time, to avoid an appreciable increase in the cost of manufacture due to the buffing operation, it being observed in passing that the proper and inexpensive buffing of fastener elements to remove burs and sharp edges therefrom is recognized in this art as quite a problem.

The invention also contemplates a novel form of interfitting male and female connection between the completed fastener elements, which connection will be found to simplify manufacture; make possible the formation of the individual fastener elements with slightly rounded ends or noses to add to the appearance of the article; to facilitate the meshing of the fastener elements and, at the same time, to limit rocking movement of the fastener elements, one with respect to the other when in final interdigitating relation.

Other objects and advantages will be apparent during the course of the following description.

In the accompanying drawings forming a part of this application and in which like numerals are employed to designate like parts throughout the same.

Figure 1:
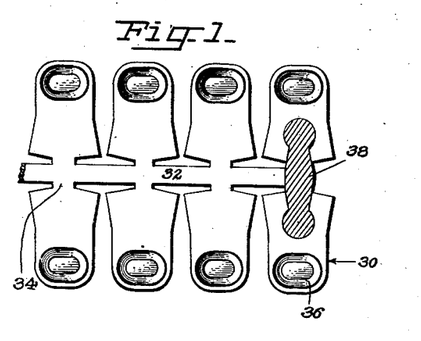
Figure 1 is a fragmentary plan view of a strip of fastener elements embodied in the invention, the view illustrating a die in operative relation to oppositely located fastener elements.

In the drawings, and particularly Figure 1, the numeral 30 generally designates a strip of previously formed fastener elements. In this figure, it is illustrated that the fastener elements may be formed in parallel rows and that such parallel rows are located at opposite edges of a connecting band or webbing 32 through the intervention of short lateral branches or lugs 34.

It is believed to be apparent that the rows of fasteners 30 and the included webbing 32 are formed from an originally flat imperforate metallic ribbon having a width equal to or greater than the space between the outer extremities or nose portions of the individual fastener elements.

Coincident with the punching operation by which the fastener elements are outlined, the material composing the individual fastener elements is formed with indentations or sockets 36 producing projections adapted to be snugly received in the complemental elements of a completed slide fastener.

It will be seen that the projections or male members of the fastener elements are tapered toward the leading ends thereof while the complemental sockets 36 are flared or enlarged toward the inlet ends thereof for the easy reception of the projections.

Also, the sockets 36 and the resulting projections will be found to be in the form of flattened ovals having parallel side walls in longitudinal cross section joined by approximately semi-circular end walls. This configuration facilitates the connection and disconnection of the elements of the completed fastener and, in addition, makes possible the rounding of the adjacent nose portions of the fastener elements so as to avoid sharp angles or corners which might interfere with the proper bringing together and later separation of the fastener elements in the completed article. The rounding of the nose portions of the fastener elements also adds to the appearance of the completed article.

The arrangement of the rows of fastener elements as shown in Figure 1, and more particularly, the connection of the individual fastener elements with the central band 32 through the intervention of the lateral branches 34, provides a simple and convenient means by which the fastener elements may be colored, dyed or plated while still in strip form. It will be observed that all those surfaces and edges of the fastener elements exposed in the completed slide fastener are exposed for application of a coloring, dyeing, or plating medium, even though the fastener elements are still in strip form.

That is to say, the particular connection between the band 32 and the individual fastener elements calls for the subsequent employment of a cut-off punch 38 of a width and formation to simultaneously cut through oppositely located fastener elements without leaving raw edges that will be exposed in the finished product. When the cut-off punch 38 is advanced, as shown in Figure 1, the oppositely located fastener elements are bifurcated or formed with tape engaging jaws while, at the same time, the fastener elements are severed from the webbing 32 and the lateral branches 34.

Of course, the strip of fastener elements 30 is subjected to the action of the cut-off punch only after the coloring, dyeing or plating operation, and it is important to observe that the raw edges left by the cut-off punch will be engaged with the tape and will not be exposed to view in the completed fastener.

The cut-off punch 38 is shown to have enlarged cylindrically beaded edges with the element engaging sides of the punch in converging relation to form key-hole openings in the fastener elements.

The key-hole openings thus produced in the individual fastener elements, at the jaw portions thereof, of course, might be said to have circular inner portions and diverging side walls, the latter defining gradually restricted entrance openings for the tape.

It is further illustrated in Figure 1 that the jaw portions of the individual fastener elements have the outer edges thereof initially flared or in diverging relation. This provides for the subsequent inward clamping of the jaws in engagement with the tape, bringing the outer edges of the jaws into approximately parallel relation to each other.

Attention is now invited to the fact that the arrangement of the fastener elements in rows at opposite sides of the intervening web, with the various edges of the fastener elements spaced from each other and from the web, not only provides for the coating of the entire surfaces of the fastener elements, but, at the same time, looks to effective and expeditious buffing of the fastener elements to remove therefrom those burs and sharp edges resulting from the immediately preceding and initial punching operation, all while the fastener elements are still in strip form. This also avoids material waste.

Figure 2:
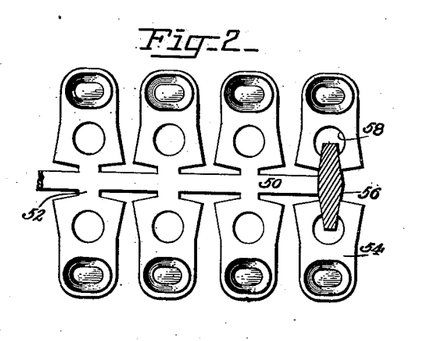
Figure 2 is a similar view disclosing a slightly modified form of strip.

In the form of strip illustrated in Figure 2, the band or ribbon 50 is provided with laterally projecting branches or legs 52 joined with the jaw portions of the fastener elements 54 at the points where the cut-off punch 56 passes through the material forming this strip.

The form of strip shown in Figure 2 differs from the disclosure in Figure 1, in that the individual fastener elements are provided with openings or recesses coincident with the initial punching operation by which the fastener elements are outlined or given the form shown in Figure 2. This form of strip calls for the employment of the cut-off punch 56 in which the sides thereof diminish in wall thickness toward the outer edges thereof and which punch may be without the beaded outer edges.

The operation of the cut-off punch 56 leaves oppositely located fastener elements 54 with keyhole openings for the reception of mounting tapes, the outer portions of such openings having converging sides to guide the tape into proper position in the openings.

Of course, as one of the final steps in the mounting of the individual fastener elements 54 upon tapes, the jaws are brought into pressure engagement with the tapes and in looking to this, it will be found the jaw portions of the fastener elements have the outer edges thereof in initially diverging or flared relation so that when the jaws are clamped in engagement with the tapes, the outer edges of the fastener elements will be approximately parallel throughout.

The arrangement of the fastener elements in strip form and in oppositely located rows provides for the buffing of the fastener elements while still in strip form and immediately after the initial forming operation; provides a simple means by which the entire ultimately exposed surfaces of the individual fastener elements may be colored, plated or dyed, and also provides for the twin production of fastener elements at each stroke of the punch press and looks to the accelerated separation of the individual fastener elements from the strip, and the delivery of the fastener elements to assembly units.

Figure 3:
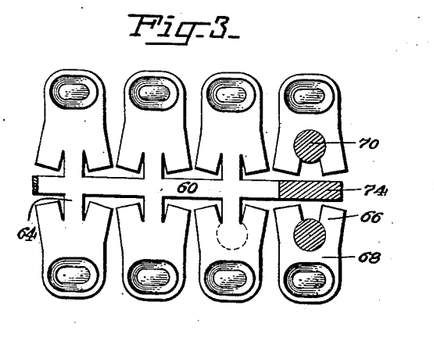
Figure 3 is a similar view disclosing another form of strip.

In the form of strip disclosed in Figure 3, the central band or ribbon is designated by the numeral 60 and is provided at uniformly spaced points with pairs of laterally directed branches or lugs 64 extending between the diverging jaws 66 of the fastener elements 68. More specifically, the laterally projecting branches or lugs 64 connect with the individual fastener elements at points between the ends of the elements and the edges of these branches are spaced from the inner edges of the jaws, so that when the cylindrical cut-off punches 70 are advanced to the positions suggested in Figure 3, the individual fastener elements will be given cylindrical recesses and at the same time the branches 64 will be cut off at the points where the same join the fastener elements.

Of course, the strip as shown in Figure 3 was outlined by a previous forming operation from an initially flat metallic ribbon having a width equal to or greater than the distance between the nose portions of oppositely located fastener elements 68.

It will be seen that although the fastener elements 68 are in strip form, all surfaces and finally exposed edges thereof are available for coloring, dyeing or plating and that the raw edges left by the cut-off punches 70 will not be exposed to view in the completed slide fastener. In addition to looking to the coloring of the individual fastener elements while still in strip form, the form of strip shown in Figure 3 provides a simple means by which all rough edges and burs resulting from the original forming operation may be removed as a preliminary to the coloring process and while, of course, the fastener elements are still in strip form.

A punch 74 may be positioned between the cut-off punches 70 and caused to operate in unison therewith to cut the central webbing or ribbon 60 into short pieces and thereby avoid an objectionable coiling of this material in the region of the cut-off punches.

Figure 4:
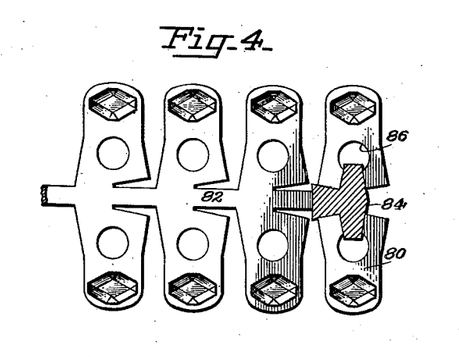
Figure 4 is a similar view disclosing a further form of strip.

Figure 4 shows a form of strip in which the fastener elements 80 are arranged at right angles to the intervening connecting ribbon or band 82 and in the form of parallel rows in which the fastener elements are arranged in edge-to-edge spaced relation.

In this form of strip, the inner or jaw portions of the fastener elements 80 are indirectly joined with the longitudinally extending band or ribbon 82 by means of an intervening approximately triangular portion of ribbon material extending laterally from central web 82, and it requires a cut-off punch 84, somewhat T-shaped in cross-section, to define the pairs of jaws in the fastener elements and to sever these fastener elements from the central webbing 82.

In the form of strip shown in Figure 4, the fastener elements are provided with circular openings 86 and it is the function of the lateral vanes of the cut-off punch 84 to cut through those portions of the fastener elements between the openings 86 and the opposed or inner ends of the fastener elements. When the cut-off punch 84 has been advanced as shown in Figure 4, the oppositely located fastener elements 80 are provided with jaws having the inner and outer edges thereof in somewhat diverging or flared relation. The flared arrangement of the inner edges of the jaws of the fastener elements provides for the easy entrance of the mounting tapes into the spaces between the jaws and when the jaws have been clamped in engagement with the previously admitted tapes, both the inner and outer edges of the jaws will be found to be substantially parallel.

It will be seen that only one jaw of each fastener element 80 constitutes the sole connection between each fastener element and the central band 82, and this connection is through an intermediate portion of ribbon material so that when the cut-off punch severs a fastener element from the band 82 by removing this intermediate portion, only one end of one jaw will be left uncolored, it being understood, of course, that the strip of fastener elements as shown in Figure 4 are colored after being buffed and prior to the action of the punch 84.

The action of the die 84 shown in Figure 4 completes the formation of the jaws of the fastener elements and simultaneously severs two fastener elements from the central webbing or ribbon 82. If the strip has been previously colored, the uncolored portion left through the operation of the punch 84 would be of no serious consequence. Such uncolored portion of the fastener element would be at the end of only one of the jaws of the fastener element and such jaw could be arranged so that it would be on the under or inner side of the completed slide fastener and thus concealed from view. However, the point of connection between a particular fastener element 80 and the web 82 is very small and even though exposed to view would be inconspicuous.

The arrangement of fastener elements in strip form as shown in Figure 4 provides for the buffing away of the sharp edges or burs resulting from the initial forming or outlining operation and at the same time looks to the coloring of the fastener elements while still in strip form, it being observed in this connection that the coloring process is materially simplified by having the fastener elements in strip form as distinguished from the coloring of the fastener elements when separated.

Figure 5:
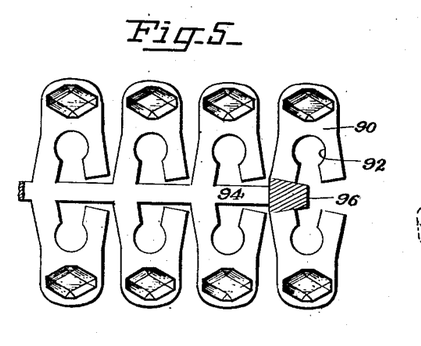
Figure 5 is a similar view disclosing another form of strip.

In the form of strip disclosed in Figure 5, the fastener elements are designated by the numeral 90 and simultaneously with the original forming or outlining operation the fastener elements are punched to provide key-hole openings 92 defining diverging jaws for engagement with the mounting tape. In this form of strip, the fastener elements are, of course, arranged in edge-to-edge spaced relation and in rows at opposite sides of the central ribbon or web 94 with one jaw of each fastener element connected with the web, through an intermediate portion of ribbon material.

The cut-off die 96 is shown to be somewhat dovetailed and acts between a pair of oppositely located fastener elements 90 to simultaneously detach these fastener elements from the web 94 by removing the intervening material. As in the case of the strip shown in Figure 4, the terminal of one jaw of each fastener element is the only part of the fastener element not exposed for coloring while the fastener elements are still in strip form and, if expedient or desirable, this uncolored portion may be finally arranged so that it is concealed. The forming of the tape receiving openings 92 coincident with the original outlining operation of the fastener elements looks to the removal of the burs along the walls of the openings 92 at the time the remaining portions of the fastener elements are being buffed.

Figure 6:
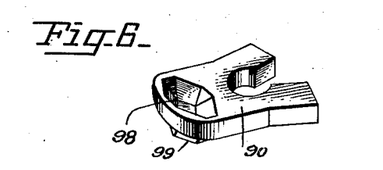
Figure 6 is a perspective of a completed fastener element.
Figure 7:
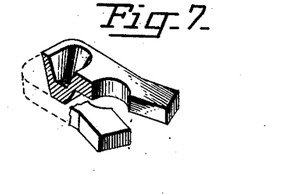
Figure 7 is a fragmentary sectional perspective of a modified form of fastener element.

The fastener elements shown in Figures 4, 5, and 6 are formed with diamond-shaped recesses 98 defining similarly shaped projections 99. Such recesses and projections are reduced or tapered from the surfaces from which the same extend or originate to provide for easy assembly when the completed fastener elements are brought into interfitting relation. More specifically, the bottom of each recess is in the form of a rhombus while the top is octagonal, having all opposed edges parallel and all of equal length in the same plane, the said edges being alternately short and long thereby producing side walls alternately triangular and trapezoidal in form.

At the same time, the form of recess and projection shown in Figures 4, 5, and 6 permits of the formation of the nose portions of the fastener elements with curved or rounded lines, thereby avoiding the sharp corners known to be objectionable for several reasons.

Figure 8:
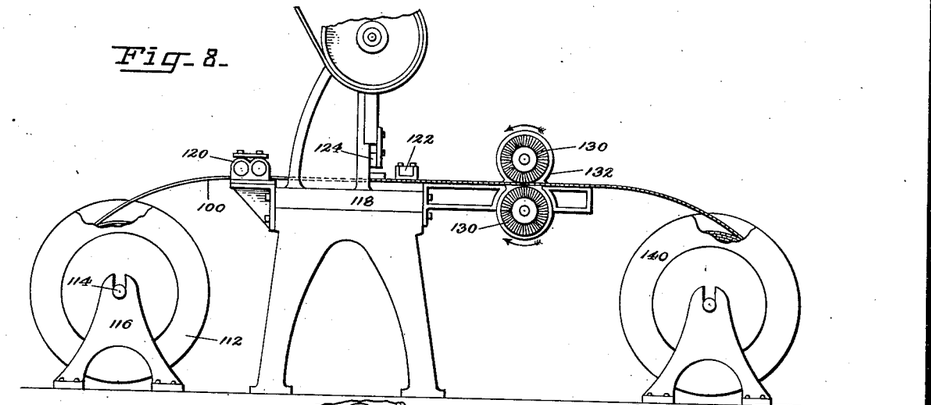
Figure 8 is a fragmentary side elevation disclosing a forming and buffing mechanism for fastener elements.

The various forms of strips shown in Figures 1 to 7, inclusive, may be produced by the arrangement shown in Figure 8, in which the numeral 100 designates a length of metallic or other ribbon having cross-sectional dimensions suited to the size of the fastener elements to be produced.

Figure 8 illustrates that the metallic ribbon 100 is initially mounted on a support 112, preferably in the form of a reel having pintles 114 rotatably supported by standards 116. The reel 112 is detachably mounted so that when the supply of metallic ribbon has been exhausted, the reel may be removed and a loaded one applied in its place.

In practice, the ribbon 100 is threaded through a punch press 118. More particularly, the ribbon 100 is threaded through an automatic feeding and spacing device 120 and through an automatic stop 122, a die punching unit 124 being positioned between the members 120 and 122. Of course, the die 124 is intermittently actuated in any preferred manner to produce a plurality of initially connected fastener elements which may be of the types shown in Figures 1 to 7, inclusive.

By further reference to Figure 8, it will be seen that after the die stamping or punching operation, the newly formed fastener elements, while still in strip form, are directed between the buffing elements 130 of a buffing unit 132.

The buffing wheels 130 turn in the direction of travel of the newly formed fastener elements and thus maintain taut the strip of such elements. It is believed to be clear that the purpose and nature of the elements 130 require that the same rotate at a peripheral speed substantially greater than the speed of the strip of fastener elements.

As brought out in the opening paragraphs of this specification, the operation of the die 124 leaves the newly formed fastener elements with rather sharp edges and numerous burs, which, unless removed, would offer serious interference with the smooth operation of the slider of the completed fastener, and in addition, such burs and sharp edges frequently snag the sheer and other fabrics with which the same come in contact.

The simple and inexpensive removal of these burs and sharp edges from the individual fastener elements is recognized as a troublesome problem in this industry and, in appreciation of this, it has been found that the mounting of the buffing unit 132 at a point immediately beyond the forming station, as disclosed in Figure 8, provides for the effective buffing of the fastener elements while still in strip form and without material increase in the cost of manufacture.

In further adverting to the buffing operation, it is pointed out that the arrangement disclosed in Figure 8 provides for the performance of this important operation while the individual fastener elements are still in strip form, which has been found to provide for the most convenient handling and presentation of the fastener elements to the buffing wheels. In other words, no separate handling of the fastener elements is required for presentation of the same to the buffing wheels.

By reference to Figures 1 to 5, inclusive, it will be seen that the various fastener elements are arranged in edge-to-edge spaced relation for engagement on all surfaces thereof by the buffing wheels.

From the buffing unit 132, the fastener elements in strip form are delivered to a reel 140. In practice, the space between the end walls of the reel 140 is only slightly greater than the width of the ribbon from which the fastener elements are formed. This requires that the strip of fastener elements be coiled on the reel with each succeeding coil or convolution arranged radially outward of the previously wound coil or convolution. This arrangement avoids entanglement of the individual fastener elements as would be the case were the strips of fastener elements arranged edge to edge.

With the strip of newly formed and buffed fastener elements thus coiled upon the reel, the reel may be removed from its mounting and conducted to a coloring, dyeing, or plating room where the fastener elements are suitably colored while still in strip form.

Figure 9:
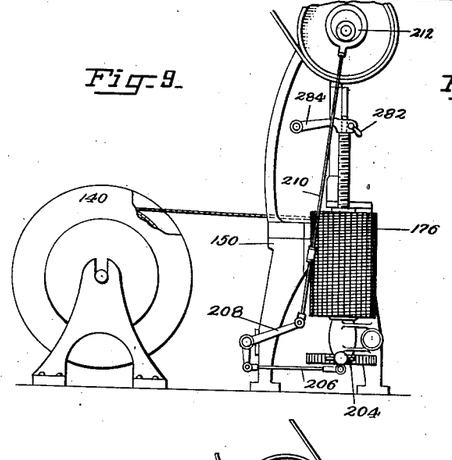
Figure 9 is a fragmentary side elevation of a mechanism for severing the fastener elements from the initial support thereof and for mounting the same for final assembly.

However, the reel 140 with its supply of fastener elements in strip form may be transferred from the position shown in Figure 8 to the position shown in Figure 9 with or without the intervention of the coloring process and in either case, the strip of fasteners is subjected to the action of a second punch press 150 where the fastener elements are separated from the strip and are directed laterally into assembly drums or magazines 176.

For a detailed showing of the severing and loading or magazining means for the individual fastener elements, particular attention is invited to Figures 12, 13, 14, 15, 17, 18, 19, 20, 21, 22, 23, 24, 25, 26, 27, and 28.

Figure 12:
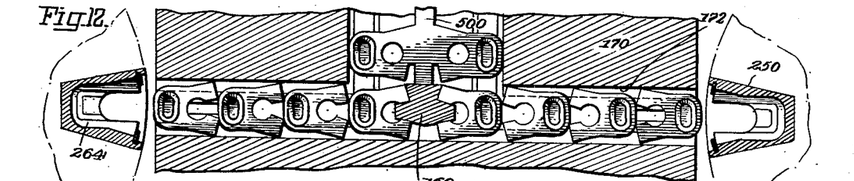
Figure 12 is a detail horizontal sectional view through the severing and assembly units.
Figure 13:
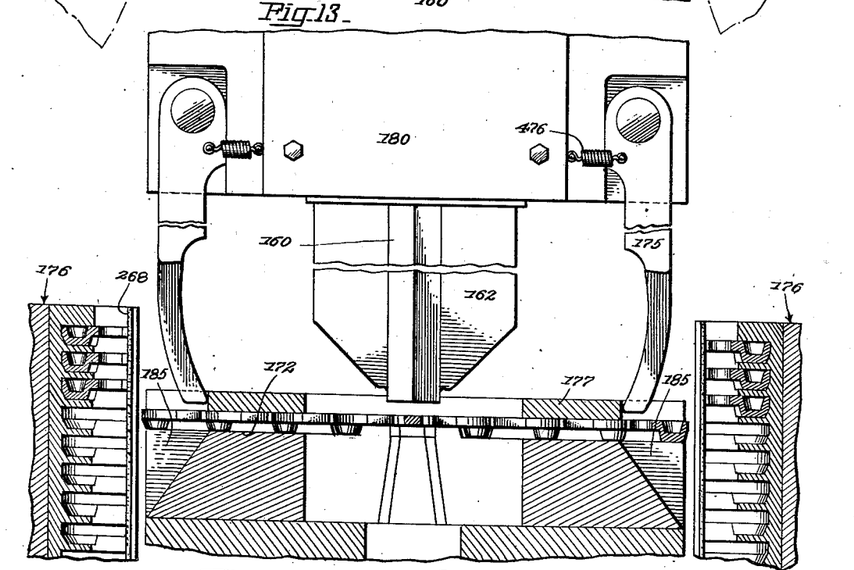
Figure 13 is a detail vertical sectional view through the mechanism shown in Figure 12.

With special reference to Figures 12 and 13, it will be seen that the strip of fasteners 500 is threaded through an opening or passage in the bed 170 of the punch press 150, so as to bring the pairs of oppositely located fastener elements successively into the range of the die 160. It is illustrated in Figure 12 that the die 160 is more or less T-shaped in cross-section so as to cut through the ribbon or central webbing of the strip of fasteners and at the same time to cut through the jaws or attaching end portions of the fastener elements, provided, of course, such second mentioned cutting operation was not performed by the previous punch press operation.

Any of the dies or any of the strips shown in Figures 1 to 5 may be used in connection with the structure disclosed in Figure 8.

The laterally projecting ribs or vanes 162 of the punch 160 are shown to be increased in width toward the upper portions thereof so that as the die descends the newly severed fastener elements are directed laterally in opposite directions into laterally directed outlet passages 172.

It is clearly illustrated in Figure 12, that the descent of the die 160 brings about the lateral movement of the newly severed fastener elements with the nose portions thereof presented outward and with the fastener elements arranged in the form of trains.

Now, by reference to Figure 13 it will be seen that the ram 180 of the punch press, in addition to carrying the die 160, is provided with a pair of pivotally mounted fingers 175 normally held in the innermost positions thereof by contractile coil springs 476.

Thus, it is believed to be clear that simultaneously with the descent of the ram 180, the fingers 175 are brought downwardly into operative engagement with the outermost fastener elements so as to transfer such fastener elements from the punch press to the magazines or assembly units 176.

More particularly, the fingers 175 have the lower portions thereof curved inward and sufficiently narrow in width to extend between the companion jaws of the individual fastener elements and thus establish contact with such fastener elements to transfer the same from the punch press to the magazine or assembly units as shown.

Figure 15:
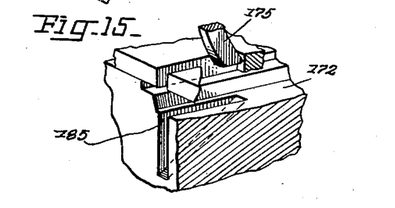
Figure 15 is a fragmentary sectional perspective disclosing the means by which the individual fastener elements are delivered from the severing mechanism to an assembly unit.

It is illustrated in Figure 15 that the bottom walls of the oppositely directed channels or passages 172 of the bed of the punch press are provided with slots 185 opening out through opposite sides of the bed and slidably receiving the fingers 175 to hold such fingers against lateral swaying. In this manner, the fastener elements engaged by the fingers are properly guided into the recesses or cells of the assembly units 176.

Of course, the ascent of the ram 180 will be accompanied by the upward movement of the fingers 175, and in this manner, the fingers are arranged for engagement with the succeeding fastener elements.

Thus, it will be seen that upon each down stroke of the ram of the punch press, a pair of fastener elements are severed from a strip of such elements and the elements of that pair are moved laterally in opposite directions, being guided in their outward movement by the walls of the channels or passages 172, through which the same are directed, and being transferred from the punch press to the assembly units under the influence of the fingers 175.

Figure 14:
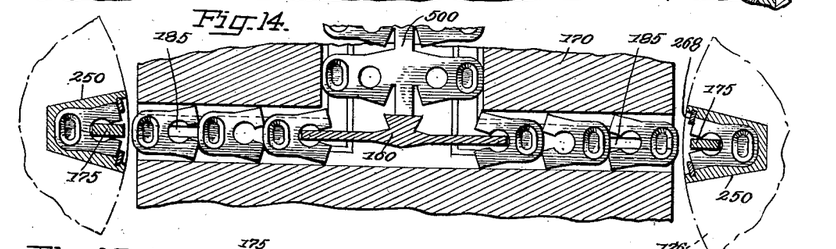
Figure 14 is a view similar to Figure 12 with the parts advanced beyond the position shown in Figure 12.

From Figures 13, 14, and 15, it will be seen that the coaction between the fingers 175, the bottom walls of the grooves 185 and the top plate 177 is such as to provide for the uniform transfer of scoops from the press to the assembly units 176. In explaining this, attention is invited to Figure 13 in which it is illustrated that the scoop engaging portions of the fingers 175 are bowed outward to move the scoops outward at uniform speeds, as distinguished from irregular speeds.

Also, the curvature of the fingers 175 imparts to the scoops being transferred, a movement somewhat faster than that imparted to the scoops by the wings of the severing punch. This keeps the scoops being placed in the drum slightly in advance of the succeeding scoops.

The curvature and width of the fingers 175 will be found to be such that on the upstroke of the ram no interference will occur between the fingers and the scoops which have already been placed in the drums. The inner edges of the fingers 175 may have a tendency to rise or contact the nose portions of the scoops which have just come into place for transfer to the assembly units. However, the presence of the top plate 177 prevents the scoops from being improperly dislodged. The top plate 177 is shown to be provided with slots for the passage of the fingers and such slots are narrow enough to operate as retainers for the scoops. In other words, should the fingers have a tendency to lift the scoops, the top plate 177 will prevent such movement.

The parts being handled are exceedingly small, with the result that extreme accuracy is required on the part of the fingers 175 and other working devices.

Figure 10:
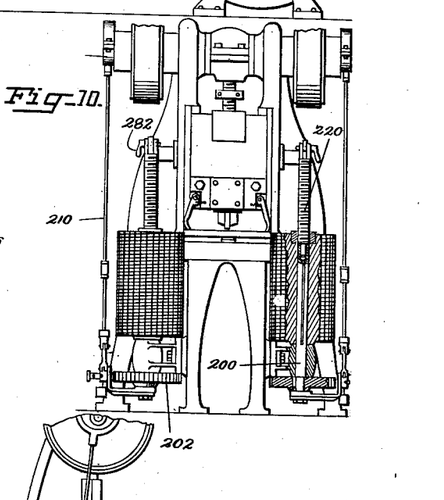
Figure 10 is a fragmentary front elevation of the mechanism shown in Figure 9, parts being in section.

The assembly unit is shown in Figure 10 to be in the nature of cylinders or drums arranged at opposite sides of the bed of the punch press and in receptive relation to the newly severed fastener elements.

More particularly, the assembly units 172 are shown in Figures 9 and 10 to be arranged vertically and to be in association with a means by which the same are intermittently turned and simultaneously elevated for the reception of the successively presented fastener elements.

It is illustrated in Figure 10 that each drum is keyed upon and is movable axially upon a shaft 200, and that the lower portion of such shaft has a ratchet wheel 202 keyed thereto.

Figure 9 discloses that each ratchet wheel 202 has the teeth thereof engaged by a pawl 204, which, in turn, is actuated by a motion transmitting link 206. The link 206 is pivoted at one end to a bell crank 208, one arm of which has pivotal connection with a pitman or motion transmitting link 210. Figure 9 further illustrates that the pitman 210 is actuated by the eccentric connection 212 upon the ram operating crank shaft of the punch press so that there is a synchronized relation between the ram and the feeding means for the several assembly drums.

This synchronized relation between the ram and the assembly drums brings about the intermittent and predetermined turning of the several drums, such movement of the drums taking place between the fastener feeding strokes of the fingers 175.

In addition, the drums 176 are intermittently raised through connection with the helical threads of the feed screw 220. The intermittent elevation of the several drums 176 is in consonance with the intermittent rotation of the drums, producing a helical arrangement of the fastener elements about the peripheries of the drums 176.

Figures 17, 18, 19, 20, 21, and 22, disclose that each drum embodies a cylindrical body around the periphery of which there is located an annular series of spaced parallel, longitudinally extending racks 250 having reduced end portions 260 closely embraced by resilient or other bands 262 serving to hold the racks detachably in place.

Figure 22:
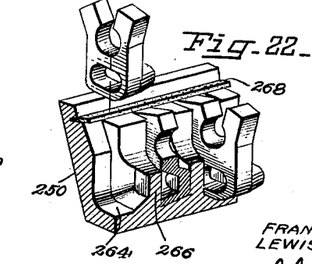
Figure 22 is a fragmentary sectional perspective disclosing an assembly rack embodied in the invention, the view illustrating several fastener elements in place and another fastener element in position for entrance to a socket in the rack.
Figure 23:
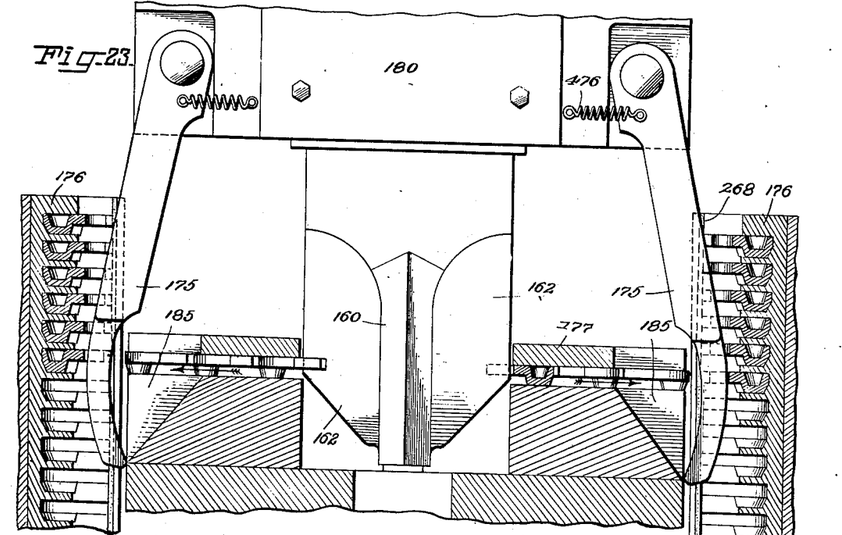
Figure 23 is a detail vertical sectional view through the fastener severing and assembly units, with the parts more advanced than in Figure 13.

In Figure 22, it is shown that each rack is formed with a longitudinal series of outwardly opening sockets or cells 264 configured for the snug reception of the fastener elements so as to hold the fastener elements in properly spaced relation, with the jaws thereof in longitudinal alignment for the reception of the mounting tapes. In this connection, it might be pointed out that the walls or partitions 266 between the sockets or cells 264 are cut away or formed with openings at the outer portions thereof in alignment with the spaces between the jaws so as to avoid interference with the entrance of the mounting tapes into the spaces between the jaws.

Further, the inner side walls of each rack 250 are shown to diverge or flare to define gradually restricted entrance openings for the admission of the fastener elements and such flaring portions are shown to carry yieldable retainer strips 268 adapted to contact the jaw portions of the fastener elements and hold the fastener elements yieldingly in place, although allowing of the subsequent removal of the same.

Figures 16, 17, 20:
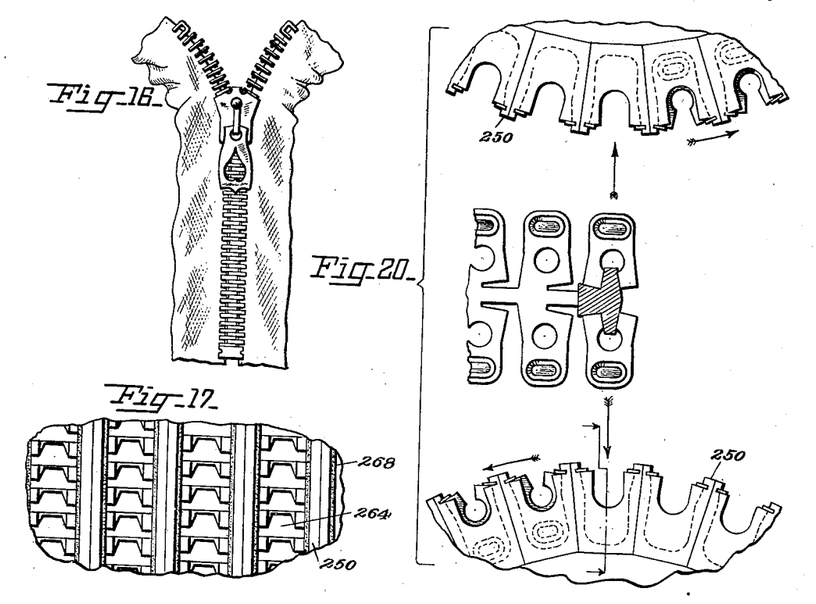
Figure 16 is a plan view of a completed slide fastener.
Figure 17 is a fragmentary side elevation of an assembly unit embodiment in the invention.
Figure 20 is a fragmentary plan view, partly in section, disclosing the relation between the severing and the assembly units.
Figure 18:
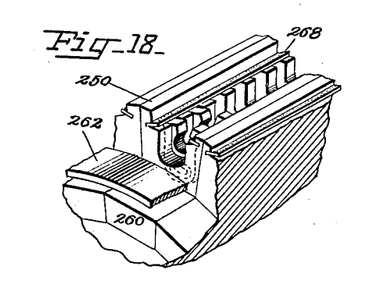
Figure 18 is a fragmentary sectional perspective of the assembly unit.
Figure 19:
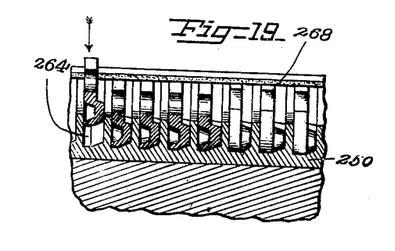
Figure 19 is a detail longitudinal sectional view through the assembly unit.
Figure 21:
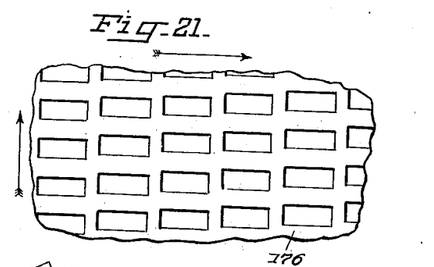
Figure 21 is a diagrammatic view of one of the assembly units.

As previously stated, and as clearly disclosed in Figures 20 and 21, the racks 250 are arranged lengthwise of the drums and due to the intermittent turning and raising of the drums, the feed of the individual fastener elements is helically about the periphery of the drums, as distinguished from the filling of each individual rack before the succeeding rack is presented to a receiving position.

In other words, the fastener elements are presented to the drums as the drums ascend and turn and the rate of speed is such that a new cell 264 will be found to be in a receptive position each time a fastener element is discharged from the punch press.

Figure 21 illustrates that the cells or sockets 264 of the racks are staggered with respect to the cells or sockets of the adjacent racks, this being required because of the intermittent turning and ascent of the drums. However, the fastener elements in a particular rack will be found to be in face to face relation to each other, with the jaw portions thereof presented outward and in longitudinal registration for the reception of the mounting tape. The tape may be applied either while the rack is in place on the drum or after the rack has been removed.

From Figures 9 and 10, it will be seen that when the drums have been filled, it is a simple matter to remove the same for the substitution of empty drums by first releasing the cam members 282 at the outer portions of pivoted holding arms 284, the latter being pivoted or otherwise secured to the frame of the punch press.

Since the various assembly drums embodied in the invention require relatively large numbers of racks of the same size, it is feasible, and in fact, it is proposed that such racks shall be in the nature of die castings to achieve the accuracy necessary for the proper handling of small parts, such as fastener elements of the interdigitating type.

Figures 24, 25, 26, 27, 28, 29, 30:
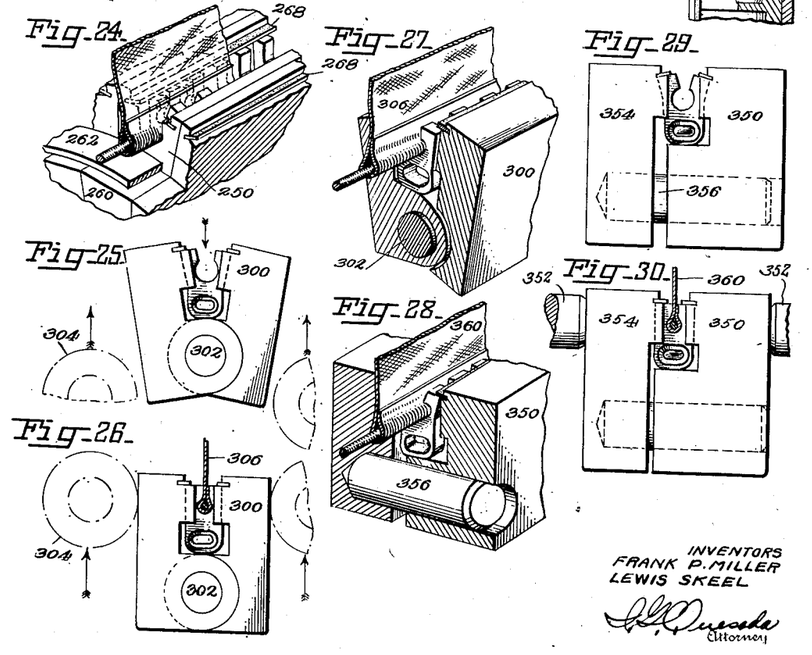
Figure 24 is a fragmentary sectional perspective through an assembly unit and disclosing a mounting tape partly in place.
Figure 25 is an end view of an assembly rack and a pair of rollers by which the jaws of the fastener elements are brought into pressure engagement with the mounting tape.
Figure 26 is a similar view with the jaws of the fastener elements in pressure engagement with the mounting tape.
Figure 27 is a fragmentary sectional perspective of the rack shown in Figures 25 and 26.
Figure 28 is a fragmentary sectional perspective disclosing a modified form of rack.
Figure 29 is an end view of the rack shown in Figure 28.
Figure 30 is an end view of the rack shown in Figure 28, with the sides of the rack brought into pressure engagement with the fastener elements to secure the fastener elements to the tape.

As shown in Figures 25, 26, and 27, the racks may be in the nature of pivotally connected side members 300 mounted upon a hinge pin 302. This permits the rack, as a whole, to be arranged in a conveniently open position for the reception of the fastener elements, after which the sides 300 may be moved between the pressure elements 304 and thus brought into pressure engagement with the jaw portions of the previously associated fastener elements to establish binding engagement between the fastener elements and the associated tape 306.

It is believed to be clear that after the passage of the pivoted racks between the pressure rollers 304, the sides 300 of the racks may be swung outwardly for the release of the now completed row of fasteners.

In the form of invention disclosed in Figures 28, 29, and 30, the rack is in the nature of slidably associated members 350 and 354, such members being movable laterally with respect to each other and slidably connected by pins 356, such pins being rigidly carried by one of the members and slidably associated with the other member. In this form of invention, the members 350 and 354 are initially separated as shown in Figure 29 for the reception of the fastener elements, and when the elements have been nested in alignment, the members 350 and 354 are brought together through the operations of plungers 352 as suggested in Figure 30 to establish clamping engagement of the jaws of the fastener elements with the mounting tape 360.

Figure 11:
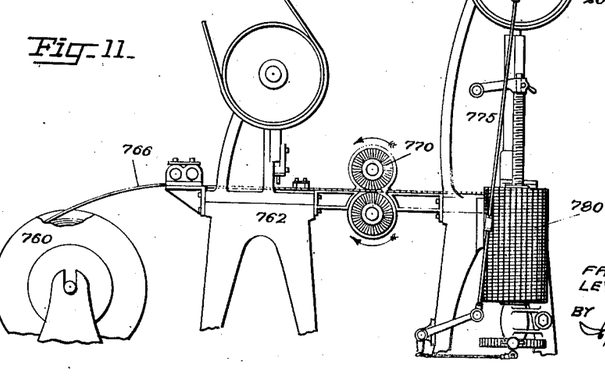
Figure 11 is a fragmentary side elevation disclosing closely associated forming, buffing, severing and assembly units.

In the manufacture of fasteners without a special coloring or coating, the equipment shown in Figure 11 may be employed. In this figure, the supply reel or drum 760 is in feeding relation to the punch press 762 by which the metallic ribbon 766 is formed with spaced parallel rows of fastener elements arranged edge to edge.

From the punch press 762 and more particularly the die member thereof, the newly formed fastener elements in strip form pass between the rotary elements 770 of a buffing unit, and from the buffing unit, the fastener elements are conveyed directly to the punch press 775 where the fastener elements are separated and moved laterally to the assembly units 780.

Having thus described the invention, what is claimed is:

1. In a structure of the class described, a punch press for severing and transferring fastener elements originally in strip form and parallel rows, a ram having a severing mechanism for severing the fastener elements and moving the same laterally in opposite directions, and fingers carried by the ram for engaging and advancing the previously severed fastener elements.

2. In a mechanism for handling fastener elements originally in strip form and parallel rows, a ram having a punch to sever the fastener elements from the original strip thereof, said punch being provided with laterally projecting wings to engage the previously severed fastener elements and move the same laterally, and fingers carried by the ram and being provided with means for extending through the fastener elements and advancing the fastener elements.

3. In a mechanism for handling fastener elements originally in strip form and parallel rows, a ram having a punch to sever the fastener elements from the original strip thereof, said punch being provided with laterally projecting wings to engage the previously severed fastener elements and move the same laterally, fingers carried by the ram and being provided with means for extending through the fastener elements and advancing the same, and a support for the fastener elements provided with means to guide said fingers while engaged with the fastener elements.

4. In a mechanism for handling fastener elements originally in strip form and parallel rows, a ram having a punch to sever the fastener elements from the original strip thereof, said punch being provided with laterally projecting wings to engage the previously severed fastener elements and move the same laterally, fingers carried by the ram and being provided with means for extending through the fastener elements and advancing the same, a support for the fastener elements provided with means to guide said fingers while engaged with the fastener elements, and an assembly unit in receptive relation to the newly severed fastener elements.

5. In a structure of the class described, a drum having a series of circumferentially located, helically arranged cells for the reception of fastener elements, said cells also being arranged in longitudinal alignment, means to intermittently turn the drum and advance the same, and means synchronized with said drum turning and advancing means for feeding fastener elements to the cells of the drum.

6. In a structure of the class described, a drum having a series of circumferentially spaced, helically arranged cells for the reception of fastener elements, said cells also being arranged in longitudinal alignment, means to intermittently turn the drum and advance the same axially, and a feeding mechanism for successively presenting fastener elements to the cells of the drum.

7. In a structure of the class described, a drum, an annular series of racks about the periphery of the drum and extending longitudinally thereof, said racks being provided with cells in longitudinal alignment and adapted for the reception of individual fastener elements, the cells of each of the racks being arranged in staggered relation with respect to the cells of the adjacent racks.

8. In a structure of the class described, a rack having spaced cells for the reception of individual fastener elements, said rack being provided with side walls, and yieldable retaining strips carried by said side walls for engagement with the fastener elements to secure the same yieldingly in place.

9. In a structure of the class described, a rack embodying a pair of sides, a pivot element connecting the sides, said sides being provided with means cooperating in the formation of cells for the reception of individual fastener elements, and yieldable retaining strips carried by said sides to secure the fastener elements in place.

10. In a structure of the class described, a rack embodying a pair of cooperating sides having means coacting in the formation of cells for the reception of fastener elements, pins slidably joining the said sides and having means permitting of the movement of one of the sides with respect to the other, and yieldable means carried by said sides to secure the fastener elements in place.

11. The herein described process of producing slide fastener elements of the interdigitating type which consists in forming the fastener elements in strip form and in spaced parallel rows, simultaneously severing pairs of individual fastener elements and directing the elements of each pair in different directions, and mounting such fastener elements upon separate assembly units.

12. In a mechanism for severing and transferring fastener elements originally in strip form and parallel rows, a ram having a punch to sever the fastener elements from the original strip thereof, said punch being provided with means to engage the previously severed fastener elements and move the same laterally, and members carried by the ram and extending through the fastener elements for advancing the same.

13. In a mechanism for severing and transferring fastener elements originally in strip form and parallel rows, a ram having a punch to sever the fastening elements from the original strip thereof, said punch being provided with means to engage the previously severed fastener elements and move the same laterally, and longitudinally curved members carried by the ram and extending through the fastener elements for advancing the same.

14. In a mechanism for severing and transferring fastener elements originally in strip form and parallel rows, a ram having a punch to sever the fastening elements from the original strip thereof, said punch being provided with means to engage the previously severed fastener elements and move the same laterally, pivotally mounted members carried by said ram and extending through the fastener elements for advancing the same, and a support for the fastener elements having means engageable by said pivotally mounted members for moving said members outwardly.

15. In a mechanism for severing and transferring fastener elements originally in strip form and parallel rows, a ram having a punch to sever the fastening elements from the original strip thereof, said punch being provided with means to engage the previously severed fastener elements and move the same laterally, pivotally mounted members carried by said ram and extending through the fastener elements for advancing the same, a support for the fastener elements having means engageable by said pivotally mounted members for moving said members outwardly, and resilient means for moving said members inwardly.

16. In a structure of the class described, a drum having a series of circumferentially spaced, longitudinal rows of cells for the reception of fastener elements, the outer portions of the walls between the cells in each longitudinal row being cut away to define longitudinally aligned openings.

17. In a structure of the class described, a drum having a series of circumferentially spaced, helically arranged cells for the snug reception of fastener elements, said cells also being arranged in longitudinal alignment and increased in area toward the periphery of the drum, means to intermittently turn and advance the drum, and means to successively feed fastener elements to the cells of the drum.

18. A method of making slide fastener elements, which comprises subjecting a metal strip to successive punching operations to produce a continuous web or band having spaced apart portions connected thereto and projecting laterally from at least one edge thereof; each of said portions comprising at least partially formed tape gripping jaws at the end connected to such band or web and an interlocking head at its opposite end, buffing the so formed strip and then by a single punching operation completing the tape gripping jaws of at least one fastener element and severing from such band or web such element in finished form.

19. A method of making slide fastener elements, which comprises subjecting a metal strip to successive punching operations to produce a continuous web or band having spaced apart portions connected thereto and projecting laterally from at least one edge thereof; each of said portions comprising at least partially formed tape gripping jaws at the end connected to such band or web and an interlocking head at its opposite end, coloring the so formed strip and then by a single punching operation completing the tape gripping jaws of at least one fastener element and severing from such band or web such element in finished form.

20. A method of making slide fastener elements, which comprises subjecting a metal strip to successive punching operations to produce a continuous web or band having spaced apart portions connected thereto and projecting laterally from at least one edge thereof; each of said portions comprising at least partially formed tape gripping jaws at the end connected to such band or web and an interlocking head at its opposite end, buffing and coloring the so formed strip; and then by a single punching operation completing the tape gripping jaws of at least one fastener element and severing from such band or web such element in finished form.

21. A method of making slide fastener elements, which comprises producing a continuous web or band having spaced apart portions connected thereto and projecting laterally from at least one edge thereof; each of said portions comprising at least partially formed tape gripping jaws at the end connected to such band or web and an interlocking head at its opposite end, smoothing the edges of said portions and then by a single punching operation completing the tape gripping jaws of at least one fastener element and severing from such band or web such element in finished form.

22. A method of making slide fastener elements, which comprises producing a continuous web or band having spaced apart portions connected thereto and projecting laterally from at least one edge thereof; each of said portions comprising at least partially formed tape gripping jaws at the end connected to such band or web and an interlocking head at its opposite end, buffing said portions and then by a single punching operation completing the tape gripping jaws of at least one fastener element and severing from such band or web such element in finished form.

23. A method of making slide fastener elements, which comprises producing a continuous web or band having spaced apart portions connected thereto and projecting laterally from at least one edge thereof; each of said portions comprising at least partially formed tape gripping jaws at the end connected to such band or web and an interlocking head at its opposite end, coloring the so formed strip and then by a single punching operation completing the tape gripping jaws of at least one fastener element and severing from such band or web such element in finished form.

24. A method of making slide fastener elements, which comprises producing a continuous web or band having spaced apart portions connected thereto and projecting laterally from at least one edge thereof; each of said portions comprising at least partially formed tape gripping jaws at the end connected to such band or web and an interlocking head at its opposite end, buffing and coloring the so formed strip and then by a single punching operation completing the tape gripping jaws of at least one fastener element and severing from such band or web such element.

25. A method of making slide fastener elements, which comprises subjecting a metal strip to successive punching operations to produce a continuous web or band having spaced apart portions connected thereto and projecting laterally from opposite side edges thereof; each of said portions comprising at least partially formed tape gripping jaws at the end connected to such band or web and an interlocking head at its opposite end, buffing the so formed strip and then by a single punching operation completing the tape gripping jaws of two fastener elements and severing from such band or web such elements in finished form.

26. A method of making slide fastener elements, which comprises subjecting a metal strip to successive punching operations to produce a continuous web or band having spaced apart portions connected thereto and projecting laterally from opposite side edges thereof; each of said portions comprising at least partially formed tape gripping jaws at the end connected to such band or web and an interlocking head at its opposite end, coloring the so formed strip and then by a single punching operation completing the tape gripping jaws of two fastener elements and severing from such band or web such elements in finished form.

27. A method of making slide fastener elements, whch comprises producing a continuous web or band having spaced apart portions connected thereto and projecting laterally from opposite side edges thereof; each of said portions comprising at least partially formed tape gripping jaws at the end connected to such band or web and an interlocking head at its opposite end, smoothing the edges of said portions and then by a single punching operation completing the tape gripping jaws of two fastener elements and severing from such band or web such elements in finished form.

28. A method of making slide fastener elements, which comprises subjecting a metal strip to successive punching operations to produce a continuous web or band having spaced apart portions connected thereto and projecting laterally from at least one edge thereof; each of said spaced apart portions comprising at least partially formed tape gripping jaws at the end connected to such band or web and an interlocking head at its opposite end and by a single punching operation completing the tape gripping jaws of at least one fastener element and severing from such band or web such element in finished form.

29. A method of forming slide fastener elements, which comprises feeding a flat strip of metal, subjecting such strip to successive punching operations to produce a continuous web or band having spaced apart portions connected thereto and projecting laterally therefrom; each of said spaced apart portions comprising tape gripping jaw portions at the end connected to such band or web and an interlocking head at the opposite end with the entire exterior edges of the head and jaw portions exposed for finishing while the elements are connected to the band or web, smoothing said exposed edges, coloring the fastener elements and finally severing such elements from the band or web whereby the only unfinished and uncolored portions of each fastener element are portions of the inner edges of its jaw portions.

30. A method of forming slide fastener elements, which comprises feeding a flat strip of metal of greater width than the overall length of such elements, subjecting such strip to successive punching operations to produce a continuous web or band having spaced apart portions connected thereto and projecting laterally therefrom; each of said spaced apart portions comprising tape gripping jaw portions at the end connected to such band or web and an interlocking head at the opposite end with the entire exterior edges of the head and jaw portions exposed for finishing while the elements are connected to the band or web, smoothing said exposed edges and finally severing such elements from the band or web whereby the only unfinished portions of each fastener element are portions of the inner edges of its jaw portions.

FRANK P. MILLER.
LEWIS SKEEL.